(12) United States Patent
Satou et al.

(10) Patent No.: US 9,601,981 B2
(45) Date of Patent: Mar. 21, 2017

(54) LINEAR ACTUATOR

(71) Applicant: KAYABA INDUSTRY CO., LTD., Tokyo (JP)

(72) Inventors: Kousuke Satou, Kanagawa (JP); Noriyuki Takahashi, Kanagawa (JP)

(73) Assignee: KYB Corporation, Tokyo (JP)

( * ) Notice: Subject to any disclaimer, the term of this patent is extended or adjusted under 35 U.S.C. 154(b) by 303 days.

(21) Appl. No.: 14/375,133

(22) PCT Filed: Jul. 12, 2013

(86) PCT No.: PCT/JP2013/069082
§ 371 (c)(1),
(2) Date: Jul. 28, 2014

(87) PCT Pub. No.: WO2014/017311
PCT Pub. Date: Jan. 30, 2014

(65) Prior Publication Data
US 2015/0015090 A1     Jan. 15, 2015

(30) Foreign Application Priority Data

Jul. 25, 2012   (JP) .................................. 2012-164710

(51) Int. Cl.
*H02K 41/03*     (2006.01)
*H01F 7/16*      (2006.01)
(Continued)

(52) U.S. Cl.
CPC ........... *H02K 33/00* (2013.01); *H02K 41/031* (2013.01); *H02K 7/08* (2013.01); *H02K 7/102* (2013.01)

(58) Field of Classification Search
CPC ........ H02K 33/00; H02K 41/02; H02K 41/03; H02K 41/031; H02K 1/18; H02K 1/28;
(Continued)

(56) References Cited

U.S. PATENT DOCUMENTS

| | | | | |
|---|---|---|---|---|
| 7,825,548 | B2 * | 11/2010 | Maemura ............... | H02K 41/03 310/12.02 |
| 9,035,732 | B2 * | 5/2015 | Satou .................... | H02K 41/031 335/229 |

(Continued)

FOREIGN PATENT DOCUMENTS

| JP | 2005-106242 A | 4/2005 |
|---|---|---|
| JP | 2007-274820 A | 10/2007 |

(Continued)

OTHER PUBLICATIONS

Extended European Search Report dated Aug. 21, 2015.

*Primary Examiner* — Tran Nguyen
(74) *Attorney, Agent, or Firm* — Rabin & Berdo, P.C.

(57) ABSTRACT

A linear actuator that is configured to be extended/contracted by relatively displacing a first tube and a second tube in an axial direction, includes a rod that is provided inside the first tube, a plurality of permanent magnets that are held in the rod so as to be arranged in the axial direction; a stopper that is provided on a tip-end portion of the rod, a coil that is provided inside the second tube so as to face the permanent magnets, and a stopper receiving portion that is provided on the second tube so as to face the stopper, wherein the relative displacement between the first tube and the second tube in the extension direction is restricted by bringing an extension-direction-side end surface of the stopper into contact with the stopper receiving portion at a fully extended position.

5 Claims, 2 Drawing Sheets

(51) Int. Cl.
*H02K 33/00* (2006.01)
*H02K 7/08* (2006.01)
*H02K 7/102* (2006.01)

(58) Field of Classification Search
CPC ........ H02K 5/10; H02K 5/167; H02K 5/1672;
H02K 7/08; H02K 9/19; H02K 11/215;
F16F 15/03; F16F 6/00; H01F 7/00;
H01F 7/16; H01F 7/1615
See application file for complete search history.

(56) References Cited

U.S. PATENT DOCUMENTS

| 2006/0181158 | A1* | 8/2006 | Tajima | B60G 17/0157 |
| | | | | 310/12.04 |
| 2008/0079522 | A1* | 4/2008 | Okada | H02K 41/031 |
| | | | | 335/229 |
| 2010/0133925 | A1 | 6/2010 | Finkbeiner et al. | |
| 2013/0175887 | A1* | 7/2013 | Kakiuchi | H02K 11/215 |
| | | | | 310/12.19 |

FOREIGN PATENT DOCUMENTS

| JP | 2008-236832 A | 10/2008 |
| JP | 2010-130805 A | 6/2010 |
| JP | 2011-193641 A | 9/2011 |
| JP | 2012-065452 A | 3/2012 |
| WO | WO 2009-039865 A1 | 4/2009 |
| WO | WO-2012/035989 A | 3/2012 |
| WO | WO 2012-039293 A1 | 3/2012 |

\* cited by examiner

LINEAR ACTUATOR

TECHNICAL FIELD

The present invention relates to a linear actuator that is extended/contracted in the axial direction by an electromagnetic force.

BACKGROUND ART

JP2005-106242A discloses a linear actuator in which a first tube and a second tube are relatively displaced in the axial direction by an electromagnetic force generated between permanent magnets provided in the first tube and coils provided in the second tube.

SUMMARY OF INVENTION

The linear actuator described in JP2005-106242A includes a shaft with fixed permanent magnets, and in a fully extended state, the shaft is subjected to a compression load due to self thrust. Therefore, the distortion of the shaft is easily propagated to the permanent magnets, and the permanent magnets may be damaged.

An object of the present invention is to prevent a permanent magnet from being damaged due to self thrust in a linear actuator that is in a fully extended state.

According to one aspect of the present invention, a linear actuator that is configured to be extended/contracted by relatively displacing a first tube and a second tube in an axial direction, includes a rod that is provided inside the first tube, a plurality of permanent magnets that are held in the rod so as to be arranged in the axial direction; a stopper that is provided on a tip-end portion of the rod, a coil that is provided inside the second tube so as to face the permanent magnets, and a stopper receiving portion that is provided on the second tube so as to face the stopper, wherein the relative displacement between the first tube and the second tube in the extension direction is restricted by bringing an extension-direction-side end surface of the stopper into contact with the stopper receiving portion at a fully extended position.

DESCRIPTION OF EMBODIMENT

Figure 1:
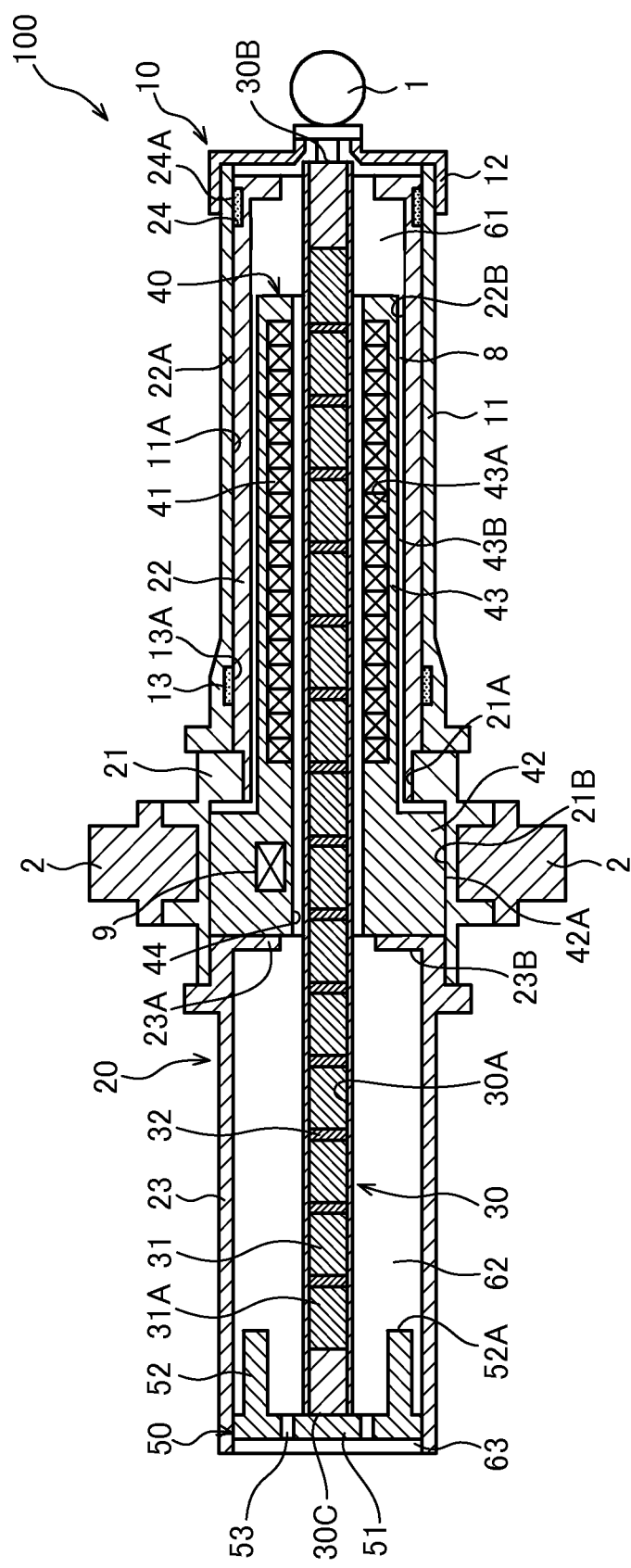
FIG. 1 is an axial cross section of a linear actuator according to an embodiment of the present invention and is a diagram showing the linear actuator in a fully contracted state.

A linear actuator 100 according to an embodiment of the present invention will be described with reference to FIGS. 1 and 2.

The linear actuator 100 is used as a vibration control actuator for suppressing vibration in, for example, automobiles, railroad vehicles, buildings, and so forth.

The linear actuator 100 includes a first tube 10, a second tube 20 that is slidably inserted into the first tube 10, a rod 30 that is fixed at the end portion of the first tube 10 and that holds permanent magnets 31, and a coil holder 40 that is provided so as to be fitted with the inside of the second tube 20 and that holds coils 41 facing the permanent magnets 31.

The linear actuator 100 is disposed between two members, which are relatively moved to each other, via a connecting portion 1 provided on the first tube 10 and connecting shafts 2 provided on the second tube 20.

In the linear actuator 100, a thrust (electromagnetic force) that drives the rod 30 in the axial direction is generated in accordance with the current flowing through the coils 41, and the first tube 10 and the second tube 20 are relatively displaced on the basis of the thrust. Thus, the linear actuator 100 extends/contracts between a fully contracted position shown in FIG. 1 and a fully extended position shown in FIG. 2.

The first tube 10 includes a cylindrical outer tube 11 having openings at both ends and a cap 12 that is connected at one end of the outer tube 11. The one end of the first tube 10 is closed by the cap 12 and the other end of the first tube 10 is formed as an open end. The connecting portion 1 is fixed on the outer-side surface of the cap 12.

The second tube 20 includes a cylindrical base portion 21, an inner tube 22 that is fixed at the one end side of the base portion 21, and a guide tube 23 that is fixed at the other end side of the base portion 21.

The base portion 21 is a tubular member having openings at both ends. A pair of connecting shafts 2 projecting in the radial directions are fixed on the outer circumference of the base portion 21. These connecting shafts 2 are provided at positions opposite to each other. The second tube 20 is connected via the connecting shafts 2 to the one of the two members, which are relatively moved to each other, and the first tube 10 is connected via the connecting portion 1 to the other of the two members, which are relatively moved.

The outer tube 11 and the inner tube 22 are tubular members having openings at both ends. The inner tube 22 is slidably inserted into the outer tube 11 in a state in which it is provided on the base portion 21. The one end of the inner tube 22 is fitted with and fixed to an inner circumferential surface 21A of the base portion 21, and thereby the inner tube 22 is supported at the one end thereof by the base portion 21.

In the linear actuator 100, the outer circumference of the inner tube 22 is slidably fitted with the inner circumference of the outer tube 11, and thus both tubes are supported in a relatively displaceable manner.

A first bearing 13 that is in sliding contact with an outer circumferential surface 22A of the inner tube 22 is provided on the inner circumference of the open end of the outer tube 11 into which the inner tube 22 is inserted. In addition, a second bearing 24 that is in sliding contact with an inner circumferential surface 11A of the outer tube 11 is provided on the outer circumference of the free end of the inner tube 22. The first bearing 13 and the second bearing 24 are annular slide materials.

The guide tube 23 is a tubular member having openings at both ends. A stopper 50 that is fixed to a tip-end portion 30C of the rod 30 is slidably fitted with the inner circumference of the guide tube 23. With such a configuration, the tip-end portion 30C of the rod 30 is prevented from swinging in the radial direction.

The rod 30 is a rod-shaped member having a hollow portion 30A. A base-end portion 30B of the rod 30 is fixed to the cap 12 forming the end portion of the first tube 10. In addition, the stopper 50 mentioned above is fixed to the tip-end portion 30C of the rod 30.

In the hollow portion 30A of the rod 30, a plurality of permanent magnets 31 are held so as to be arranged along the axial direction. The permanent magnets 31 are formed to have a columnar shape and are magnetized to exhibit N poles and S poles in the axial direction. Adjacent permanent magnets 31 are arranged such that the same magnetic poles are faced to each other. In addition, yokes 32 are provided between the adjacent permanent magnets 31. The yokes 32 may not necessarily be provided, and respective permanent magnets 31 may be arranged so as to be directly adjacent to each other.

The coil holder 40 is a tubular member having a large-diameter portion 42 and a small-diameter portion 43. The large-diameter portion 42 is formed to have the outer diameter larger than that of the small-diameter portion 43. An outer circumferential surface 42A of the large-diameter portion 42 is fitted with and fixed to an inner circumferential surface 21B of the base portion 21, and thereby the coil holder 40 is supported at the one end thereof by the base portion 21. The inner circumferential surface 21B of the base portion 21 is formed to have the inner diameter larger than that of the inner circumferential surface 21A of the base portion 21.

An annular gap 8 is formed around the coil holder 40. The annular gap 8 is formed between an inner circumferential surface 22B of the inner tube 22 and an outer circumferential surface 43B of the small-diameter portion 43 of the coil holder 40. By providing the outer circumference of the coil holder 40 and the inner circumference of the inner tube 22 such that they are separated from each other in this manner, even if the outer tube 11 and the inner tube 22 are deflected when the linear actuator 100 is subjected to a lateral load, the occurrence of the stress on the coil holder 40 is suppressed.

The configuration is not limited to that mentioned above, and a configuration in which the annular gap 8 is not formed and the inner circumferential surface 22B of the inner tube 22 is provided so as to be fitted with the outer circumferential surface 43B of the small-diameter portion 43 of the coil holder 40 without a gap therebetween is also possible.

The coil holder 40 has an insertion hole 44 through which the rod 30 is inserted in the axial direction. An annular depressed portion 43A is formed on the inner circumferential surface of the small-diameter portion 43 forming the insertion hole 44, and a plurality of coils 41 are fixed in the annular depressed portion 43A. The plurality of coils 41 are disposed side-by-side along the axial direction so as to face the permanent magnets 31.

The current supplied to the coils 41 is controlled by a controller (not shown), which is installed, for example, outside the linear actuator 100. The controller controls the magnitude and the direction of the current that is supplied to the coils 41 on the basis of relative positional-information of the coils 41 and the permanent magnets 31 detected by a position detector 9. By doing so, the level and the direction (extension/contraction direction) of the thrust generated by the linear actuator 100 are adjusted.

The position detector 9 is a Hall element that generates the Hall voltage corresponding to the strength of the magnetic field and is embedded into the inner side of the large-diameter portion 42 of the coil holder 40.

Figure 2:
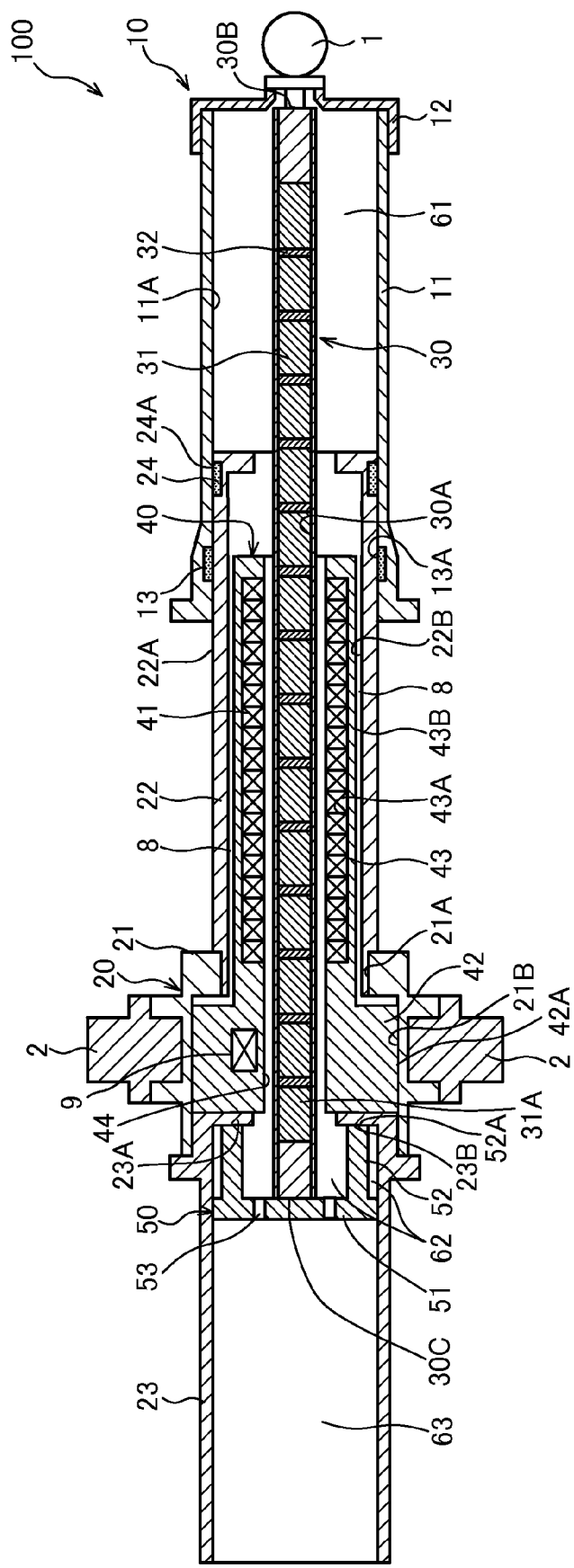
FIG. 2 is an axial cross section of linear actuator according to the embodiment of the present invention and is a diagram showing the linear actuator in a fully extended state.

In the linear actuator 100, when the current is supplied to the coils 41 in a predetermined direction, the thrust driving the rod 30 leftward in FIG. 2 is generated, the outer tube 11 is moved leftward while in sliding contact with the inner tube 22, and the linear actuator 100 is contracted.

When the linear actuator 100 is contracted to the fully contracted position (see FIG. 1), the open end of the outer tube 11 is brought into contact with the right end portion of the base portion 21, thereby restricting further movement of the rod 30. In this way, the open end of the outer tube 11 functions as a restricting portion that restricts the amount of contraction of the linear actuator 100.

On the other hand, when the current is supplied to the coils 41 in the direction opposite to that during the contraction, the outer tube 11 is moved rightward while in sliding contact with the inner tube 22, and the linear actuator 100 is extended.

When the linear actuator 100 is extended to the fully extended position (see FIG. 2), the stopper 50 fixed to the tip-end portion 30C of the rod 30 is brought into contact with a stopper receiving portion 23B provided at the fixed end of the guide tube 23, thereby restricting further movement of the rod 30.

At the fixed end of the guide tube 23, a protruding portion 23A that protrudes inward is formed, and the left-side surface of the protruding portion 23A is provided as the stopper receiving portion 23B that faces the stopper 50.

The stopper 50 has a disk-like guide portion 51 and a cylindrical stroke defining portion 52 that extends in the axial direction from the guide portion 51.

The center portion of the disk-like guide portion 51 is fixed to the tip-end portion 30C of the rod 30. The outer circumference of the guide portion 51 is slidably fitted with the inner circumference of the guide tube 23.

When the linear actuator 100 is extended/contracted, the outer circumference of the guide portion 51 is in sliding contact with the inner circumference of the guide tube 23, thereby preventing the tip-end portion 30C of the rod 30 from swinging in the radial direction.

A plurality of through holes 53 that penetrate through the guide portion 51 in the axial direction are formed in the guide portion 51. The through holes 53 communicate a second chamber 62 and a third chamber 63 that are partitioned by the guide portion 51 in the guide tube 23.

When the linear actuator 100 is extended/contracted, the air inside the linear actuator 100 travels between a first chamber 61 and the second chamber 62 through the insertion hole 44 of the coil holder 40. During this extension/contraction, external air travels into and out of the second chamber 62 through the through holes 53 of the guide portion 51 from the third chamber 63, thereby reducing the air resistance exerted on the stopper 50.

The stroke defining portion 52 is formed to have a cylindrical shape extending in the axial direction along the rod 30 and has an extension-direction-side end surface 52A at its tip end. The extension-direction-side end surface 52A is directed toward a tip-end portion 30B of the rod 30 and faces the stopper receiving portion 23B. The length of the stroke defining portion 52 in the axial direction is arbitrarily set such that the extension-direction-side end surface 52A of the stroke defining portion 52 is positioned at the side of a permanent magnet 31A that is disposed at the left end.

The shape of the stopper 50 is not limited to the configuration mentioned above, and, for example, the stroke defining portion 52 may be formed of a columnar pin extending in the axial direction from the guide portion 51.

When the linear actuator 100 is extended to the fully extended position (see FIG. 2), the extension-direction-side end surface 52A of the stroke defining portion 52 is brought into contact with the stopper receiving portion 23B to restrict the movement of the rod 30 at the position in which the tip-end portion 30C of the rod 30 is projected by a predetermined length with respect to the stopper receiving portion 23B, and thereby, the positions of the permanent magnets 31 and the coils 41 at the fully extended position are defined.

In FIG. 2 showing the fully extended state mentioned above, the permanent magnet 31A, which is disposed at the left end among the plurality of permanent magnets 31 arranged in the axial direction of the rod 30, projects with respect to the stopper receiving portion 23B in the opposite direction (left direction in FIG. 2) from the side where the coils 41 are provided. Because the permanent magnet 31A disposed at the left end is positioned within the region under the effect of the electromagnetic force of the coils 41 at the fully extended position in this way, the level of the thrust generated in the linear actuator 100 near the fully extended position is sufficiently ensured. In addition, because the permanent magnet 31A disposed at the left end moves so as to face the position detector 9 near the fully extended position, the position detector 9 can accurately detect the relative position of the rod 30 by the magnetic field generated at the permanent magnet 31A disposed at the left end.

At the fully contracted position, when the current is supplied to the coils 41 in a predetermined direction as mentioned above, the thrust that drives the rod 30 rightward in FIG. 2 is generated. This thrust generates a reaction force in the stopper 50 that is in contact with the stopper receiving portion 23B, and the rod 30 is pulled in the axial direction by the stopper 50. Because the rod 30 is subjected to a tensile load due to the self thrust of the linear actuator 100 in the fully extended state as described above, it is possible to suppress the distortion of the rod 30 compared with that undergoing deformation, such as buckling, and to prevent the permanent magnets 31 that are held in the rod 30 from being damaged.

Because buckling does not occur in the rod 30 in the fully extended state as described above, it is possible to make the thickness of the rod 30 thinner, to make the magnetic gap provided between the permanent magnets 31 and the coils 41 smaller, and to increase the thrust of the linear actuator 100.

In the linear actuator 100 according to this embodiment mentioned above, the following effects can be achieved.

In the linear actuator 100, because the extension-direction-side end surface 52A of the stopper 50 is brought into contact with the stopper receiving portion 23B at the fully extended position and the rod 30 is pulled in the axial direction, the relative displacement of the first tube 10 and the second tube 20 in the extension direction is restricted. Therefore, because the rod 30 is subjected to a tensile load due to the self thrust in the fully extended state, it is possible to suppress the distortion of the rod 30 compared with the conventional configuration that undergoes deformation, such as buckling, and to prevent the permanent magnets 31 from being damaged.

In addition, with the linear actuator 100, because the stopper 50 has the stroke defining portion 52 extending from the tip-end portion 30C of the rod 30 toward the base-end portion 30B of the rod 30 and the extension-direction-side end surface 52A of the stroke defining portion 52 is brought into contact with the stopper receiving portion 23B at the fully extended position, the positions of the permanent magnets 31 and the coils 41 at the fully extended position are defined. Therefore, the permanent magnets 31 are appropriately positioned, and the level of the thrust generated near the fully extended position is sufficiently ensured.

In addition, in the linear actuator 100, the second tube 20 includes the guide tube 23 in which the inner circumference thereof is slidably fitted with the outer circumference of the guide portion 51 of the stopper 50. Therefore, because the stopper 50 is in sliding contact with the inner circumference of the second tube 20 during extension/contraction, the tip-end portion 30C of the rod 30 is prevented from swinging in the radial direction.

In addition, in the linear actuator 100, the through holes 53 are provided on the stopper 50, and thereby, two spaces (the second chamber 62 and the third chamber 63) partitioned by the stopper 50 in the guide tube 23 are communicated through the through holes 53. Therefore, the air travels between the two spaces through the through holes 53 during extension/contraction, thereby reducing the air resistance exerted on the stopper 50.

Embodiments of this invention were described above, but the above embodiments are merely examples of applications of this invention, and the technical scope of this invention is not limited to the specific constitutions of the above embodiments.

In the above-mentioned embodiment, a configuration in which the inner circumference of the first tube 10 (the outer tube 11) to which the rod 30 is connected is slidably fitted with the outer circumference of the second tube 20 (the inner tube 22) to which the coil holder 40 is connected has been employed; however, a configuration in which the inner circumference of the second tube 20 is slidably fitted with the outer circumference of the first tube 10 may also be employed.

This application claims priority based on Japanese Patent Application No. 2012-164710 filed with the Japan Patent Office on Jul. 25, 2012, the entire contents of which are incorporated into this specification.

The invention claimed is:

1. A linear actuator that is configured to be extended/contracted by a relative axial displacement between a first tube and a second tube, the relative axial displacement being in an axial direction, comprising:
    a rod that is provided inside the first tube;
    a plurality of permanent magnets that are held in the rod so as to be arranged in the axial direction;
    a stopper that is provided on a tip-end portion of the rod;
    a coil that is provided inside the second tube so as to face the permanent magnets; and
    a stopper receiving portion that is provided on the second tube so as to contact the stopper when the linear actuator is at a fully extended position,
    wherein the stopper includes:
        a guide portion that is fixed to the rod,
        a stroke defining portion that extends in the axial direction from the guide portion, the stroke defining portion having an extension-direction-side end surface, the extension-direction-side end surface contacting the stopper receiving portion at the fully extended position of the linear actuator,
    further wherein the second tube includes a guide tube in which an inner circumference thereof is slidably fitted with an outer circumference of the guide portion,
    further wherein relative displacement between the first tube and the second tube in an extension direction of the linear actuator is restricted when the extension-direction-side end surface of the stroke defining portion and the stopper receiving portion contact each other at the fully extended position, and
    further wherein a position of the permanent magnets and a position of the coil at the fully extended position are defined when the extension-direction-side end surface of the stroke defining portion and the stopper receiving portion contact each other at the fully extended position.

2. A linear actuator according to claim 1, further comprising a position detector that is configured to detect relative positional information of the coil and the permanent magnets.

3. A linear actuator according to claim 1, wherein
the guide portion includes a through hole, and
the through hole communicates two spaces, partitioned by the stopper, in the guide tube.

4. A linear actuator according to claim 1, wherein a longitudinal axis of the stroke defining portion is parallel to the axial direction.

5. A linear actuator that is configured to be extended/contracted, the linear actuator comprising:
first and second tubes that are movable relative to each other to extend and contract the linear actuator, the first and second tubes being movable along a longitudinal axis so that the linear actuator is extendable to a fully extended position;
a rod that is provided inside the first tube;
a plurality of permanent magnets that are held in the rod so as to be arranged in an axial direction along the longitudinal axis;
a stopper that is provided on a tip-end portion of the rod;
a coil that is provided inside the second tube so as to face the permanent magnets; and
a stopper receiving portion provided on the second tube so as to contact the stopper when the linear actuator is at the fully extended position,
wherein the stopper includes:
a guide portion that is fixed to the rod,
a stroke defining portion that extends in the axial direction from the guide portion, the stroke defining portion having an extension-direction-side end surface, the extension-direction-side end surface contacting the stopper receiving portion at the fully extended position of the linear actuator,
further wherein the second tube includes a guide tube in which an inner circumference thereof is slidably fitted with an outer circumference of the guide portion,
further wherein relative displacement between the first tube and the second tube in an extension direction is restricted when the extension-direction-side end surface of the stroke defining portion and the stopper receiving portion contact each other at the fully extended position, and
further wherein at the fully extended position, a position of one of the permanent magnets is in the second tube, and a position of another of the permanent magnets is in the first tube.

* * * * *